Dec. 2, 1930.                P. N. KARABATSOS                1,783,652
                                ELECTRIC FAN
                    Filed Dec. 6, 1928        2 Sheets-Sheet 1
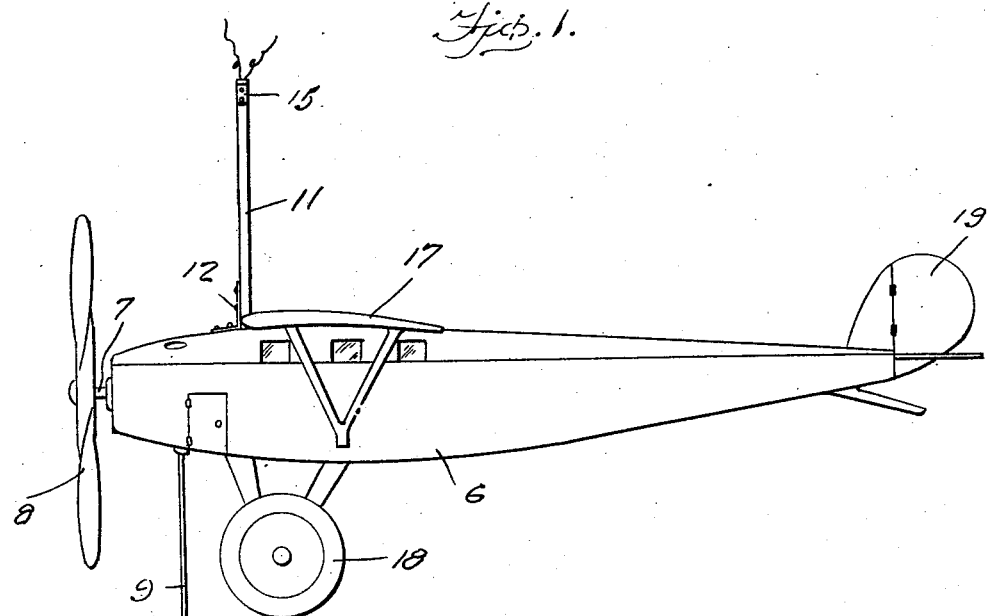
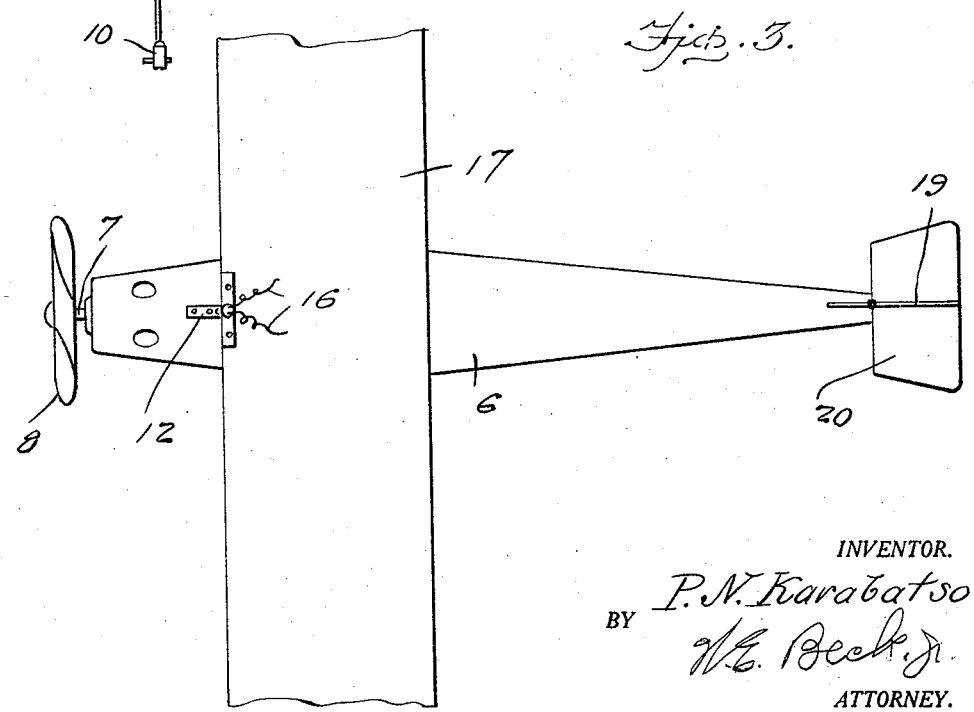
INVENTOR.
P. N. Karabatsos
BY
ATTORNEY.

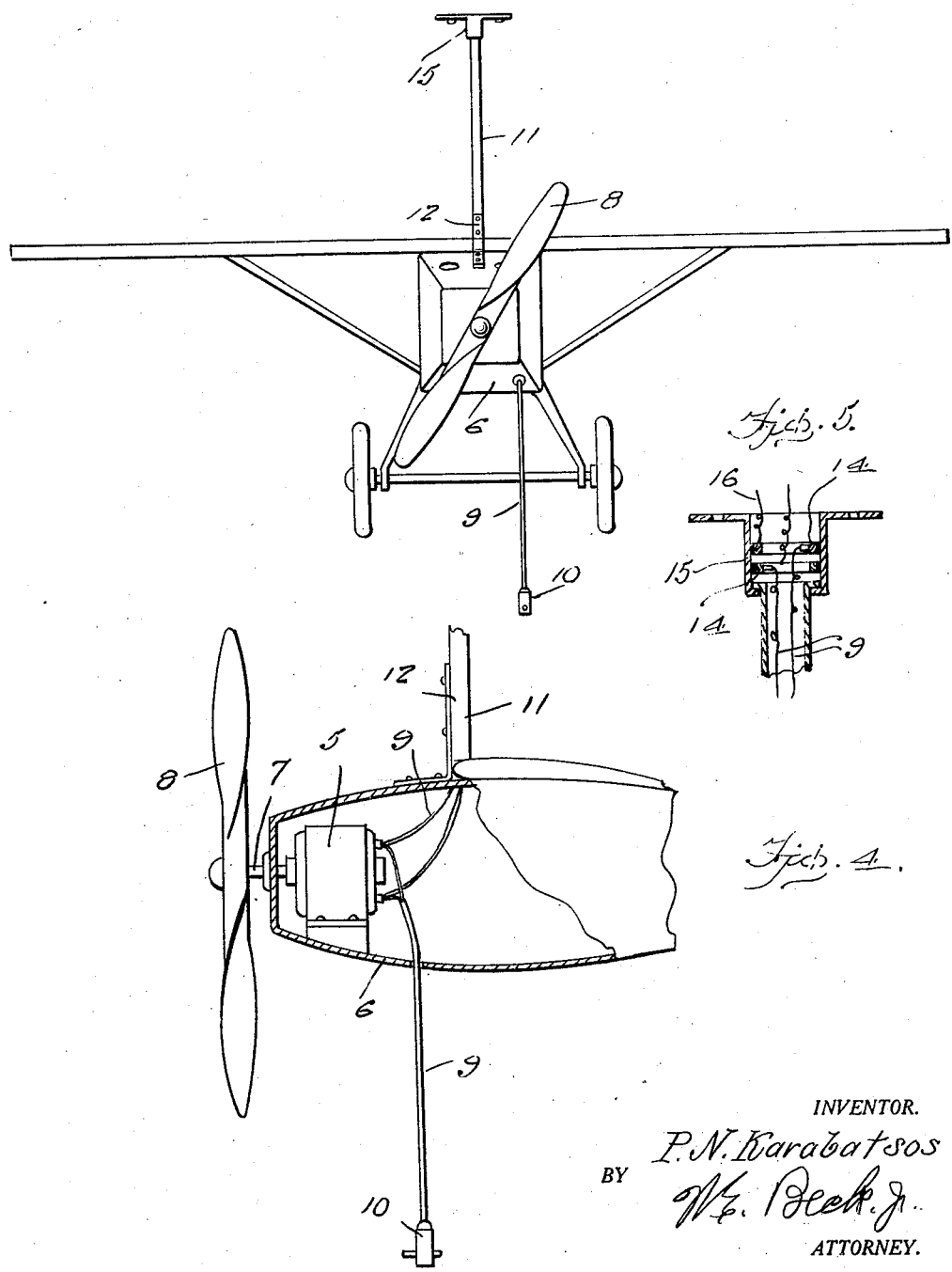

Patented Dec. 2, 1930

1,783,652

UNITED STATES PATENT OFFICE

PETER N. KARABATSOS, OF OAK PARK, ILLINOIS, ASSIGNOR OF ONE-HALF TO EMANUEL DEMEUR, OF OAK PARK, ILLINOIS

ELECTRIC FAN

Application filed December 6, 1928. Serial No. 324,217.

The present invention relates to electric fans and has for its principal object to provide a mounting to the motor of the fan in the form of a miniature airplane and providing means for suspending the same from an overhead support whereby to permit the turning of the airplane about a vertical axis so as to swing the fan in a circular direction and thus increase the effectiveness of the fan. A further object of the invention is to utilize the overhead support for the airplane to extend a circuit wire leading from the house current for operating the fan motor. A still further object is to utilize the rudder of the airplane to accomplish the circular motion of the airplane. Another object is to provide an apparatus of this character of a simple and practical construction, which is efficient and reliable in performance, neat and attractive in appearance, inexpensive to manufacture and otherwise well adapted for the purposes for which the same is intended. Other objects and advantages reside in the special construction, combination and arrangement of the various elements forming the invention as more fully hereinafter described and claimed, reference being had to the accompanying drawings forming part hereof, wherein like numerals refer to like parts throughout the specification and in which, Figure 1 is a side elevational view,
Figure 2 is a front elevational view,
Figure 3 is a top plan view,
Figure 4 is a fragmentary side elevational view of the forward end of the airplane with parts broken away and shown in section, and
Figure 5 is a detail of the swivel mounting for the supporting rod.

Referring now to the drawings in detail, the invention comprises an electrically operated fan including an electrically driven motor 5 mounted in the forward portion of an airplane fuselage 6 and with the shaft 7 of the motor extending forwardly of the fuselage and provided with a fan blade 8 constructed in the form of a propeller blade. To the motor 5 is attached the usual circuit wires 9 with a switch 10 interposed therein and suspended through an opening in the fuselage within convenient reach of a person for controlling the operation of the motor. The wires 9 extend upwardly through a pipe 11 having one end secured to the top of the fuselage by a bracket 12 and extending vertically with its upper edge formed into a flange 13 and rotatably supported upon an internal flange 14 formed at the lower end of a ceiling attached socket 15, the airplane thus being adapted for circular movement about a vertical axis. The upper ends of the wire 9 extend through the pipe 11 and are attached to a pair of spring contact fingers 13, said contact fingers being disposed in wiping engagement with a pair of contact rings 14 disposed about the inner walls of the socket 15 and to which is connected circuit wires 16 connected with the house current. Thus continuous circuit is provided for the motor during the rotation of the pipe. The airplane is constructed in a conventional manner including wings 17, landing gear 18, rudder 19 and tail fins 20 and it will be apparent that by adjusting the rudder 19 to either side of the center line of the fuselage and upon the operation of the blade 8 that the force of air from the blade directed rearwardly will strike the rudder and cause the swinging of the airplane in a circular movement upon the pipe 11. The propeller blade 8 will accordingly act as a fan and through the circular movement of the airplane the air will be directed to all parts of the room within which the airplane is suspended.

It is obvious that the invention is susceptible of various changes and modifications without departing from the spirit thereof or the scope of the appended claim, and I accordingly claim as my own all such forms of the invention to which I am entitled.

I claim:

An electric fan comprising in combination a miniature airplane having an electric motor mounted in its forward end, a propeller blade rotatably mounted at the forward end of the airplane and operatively connected with the motor, a tubular member extending upwardly from the airplane, a right angle brace for the lower end of the member to rigidly secure the same and an attaching bracket pivotally carried at the upper end of the member to provide suspension means for the airplane, said tubular member providing a conduit for the circuit wires of the motor.

In testimony whereof I affix my signature.

PETER N. KARABATSOS.